US009955148B2

(12) United States Patent
Kim et al.

(10) Patent No.: US 9,955,148 B2
(45) Date of Patent: Apr. 24, 2018

(54) METHOD AND SYSTEM FOR REPRODUCING AND WATCHING A VIDEO

(75) Inventors: Tae Jung Kim, Seoul (KR); Kyo Shin Bae, Seoul (KR)

(73) Assignee: 3D Labs Co., Ltd., Incheon (KR)

( * ) Notice: Subject to any disclaimer, the term of this patent is extended or adjusted under 35 U.S.C. 154(b) by 1114 days.

(21) Appl. No.: 13/979,915

(22) PCT Filed: Jan. 9, 2012

(86) PCT No.: PCT/KR2012/000201
§ 371 (c)(1),
(2), (4) Date: Sep. 18, 2013

(87) PCT Pub. No.: WO2012/099354
PCT Pub. Date: Jul. 26, 2012

(65) Prior Publication Data
US 2014/0002600 A1    Jan. 2, 2014

(30) Foreign Application Priority Data

Jan. 17, 2011  (KR) .................. 10-2011-0004515
Jun. 1, 2011   (KR) .................. 10-2011-0052774

(51) Int. Cl.
| H04N 13/04 | (2006.01) |
| H04N 13/00 | (2018.01) |
| H04N 13/02 | (2006.01) |

(52) U.S. Cl.
CPC ..... *H04N 13/0447* (2013.01); *H04N 13/0055* (2013.01); *H04N 13/0239* (2013.01); *H04N 13/0296* (2013.01); *H04N 13/0438* (2013.01); *H04N 13/0452* (2013.01); *H04N 13/0497* (2013.01)

(58) Field of Classification Search
CPC ........... H04N 13/0239; H04N 13/0055; H04N 13/0497; H04N 13/0296
See application file for complete search history.

(56) References Cited

U.S. PATENT DOCUMENTS

| 7,750,425 B2 | 7/2010 | Forrest et al. | |
| 8,934,002 B2* | 1/2015 | Ham .................. | G02B 27/0093 348/42 |
| 2010/0073467 A1* | 3/2010 | Nam .................. | G02B 27/2214 348/59 |
| 2010/0245400 A1* | 9/2010 | Nakahata ............... | G09G 3/003 345/690 |
| 2011/0012993 A1* | 1/2011 | Kuno .................... | G09G 3/003 348/43 |
| 2011/0146774 A1 | 6/2011 | Kim et al. | |
| 2011/0146775 A1 | 6/2011 | Kim et al. | |

(Continued)

FOREIGN PATENT DOCUMENTS

| JP | 2010509772 A | 3/2010 |
| KR | 1020100019722 A | 2/2010 |

(Continued)

*Primary Examiner* — Shawn An
(74) *Attorney, Agent, or Firm* — The Webb Law Firm

(57) ABSTRACT

The present invention relates to a method and system for reproducing and watching a video. More specifically, according to the present invention, when a plurality of three-dimensional videos are reproduced, a plurality of users can select different preferred videos to simultaneously watch the selected videos.

15 Claims, 11 Drawing Sheets

(56) References Cited

U.S. PATENT DOCUMENTS

2011/0304616 A1\* 12/2011 Ham ................... G02B 27/0093
                                                    345/419
2013/0003177 A1\* 1/2013 Ko ..................... H04N 13/0429
                                                    359/464

FOREIGN PATENT DOCUMENTS

| KR | 1020100027016 A | | 3/2010 | |
|----|-----------------|---|--------|----------|
| KR | 10-2010-0054739 | \* | 6/2010 | ............. G06T 15/00 |
| KR | 1020100067771 A | | 6/2010 | |

\* cited by examiner

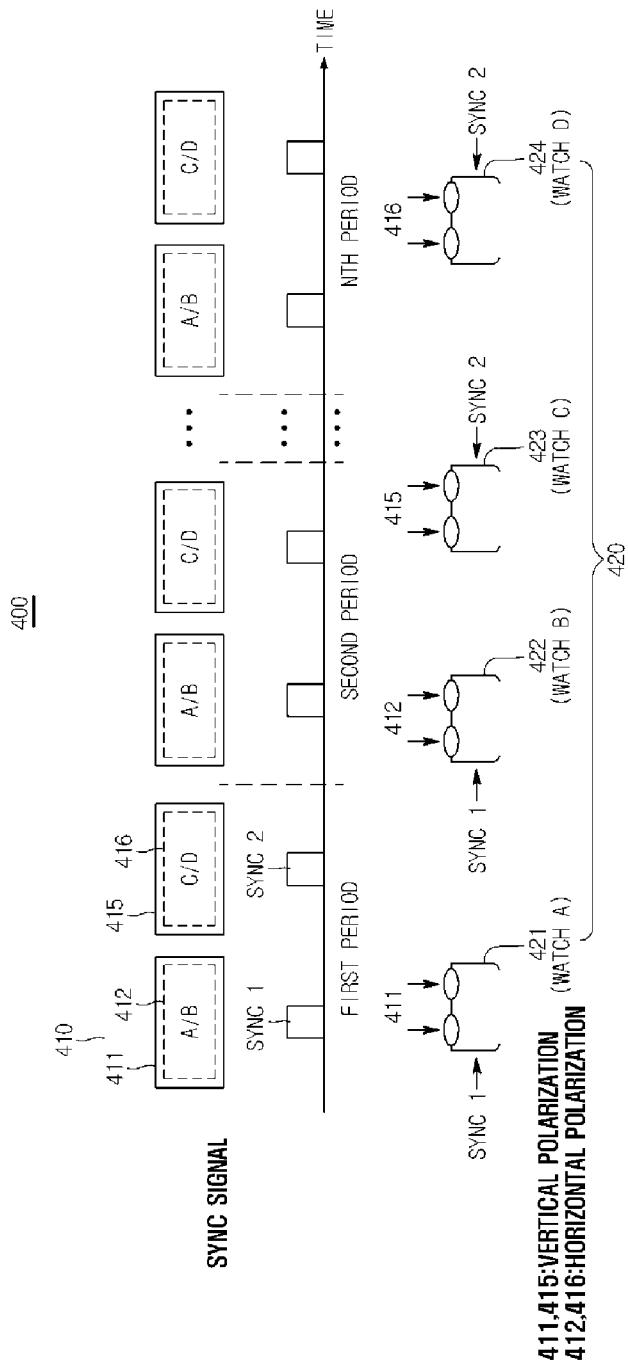

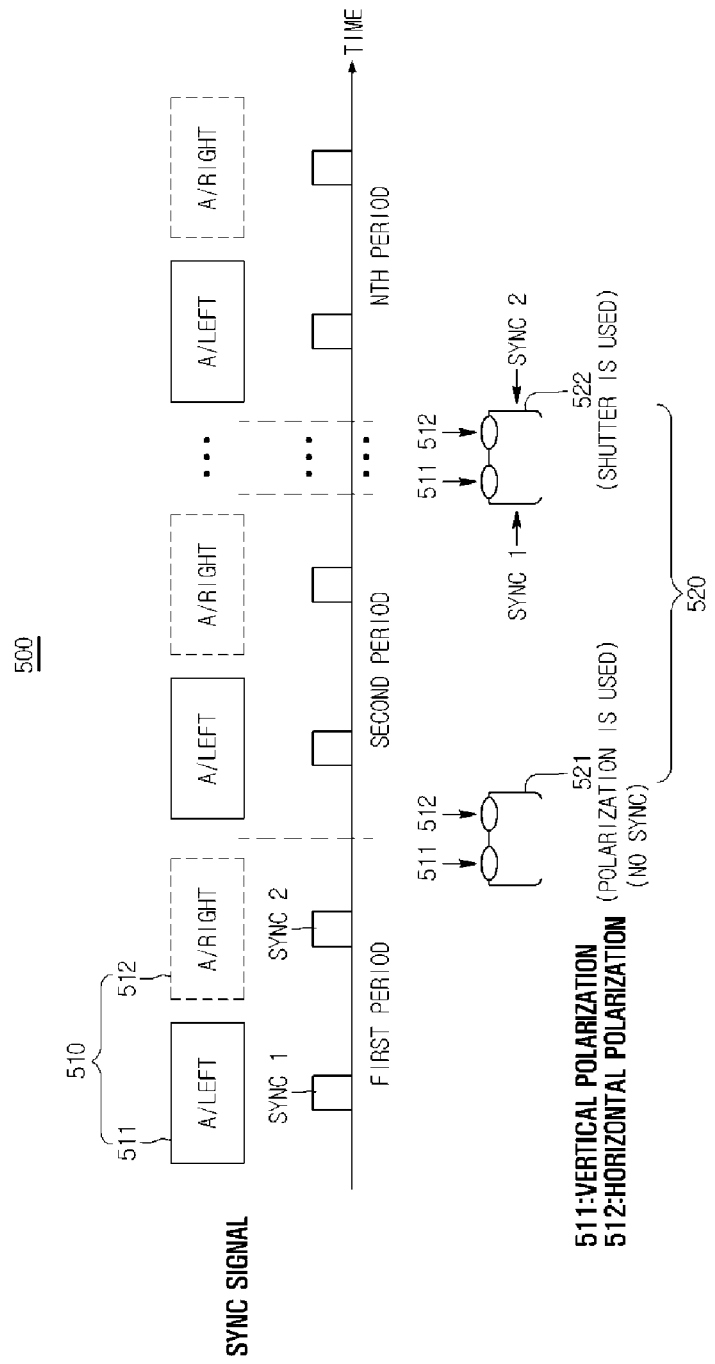

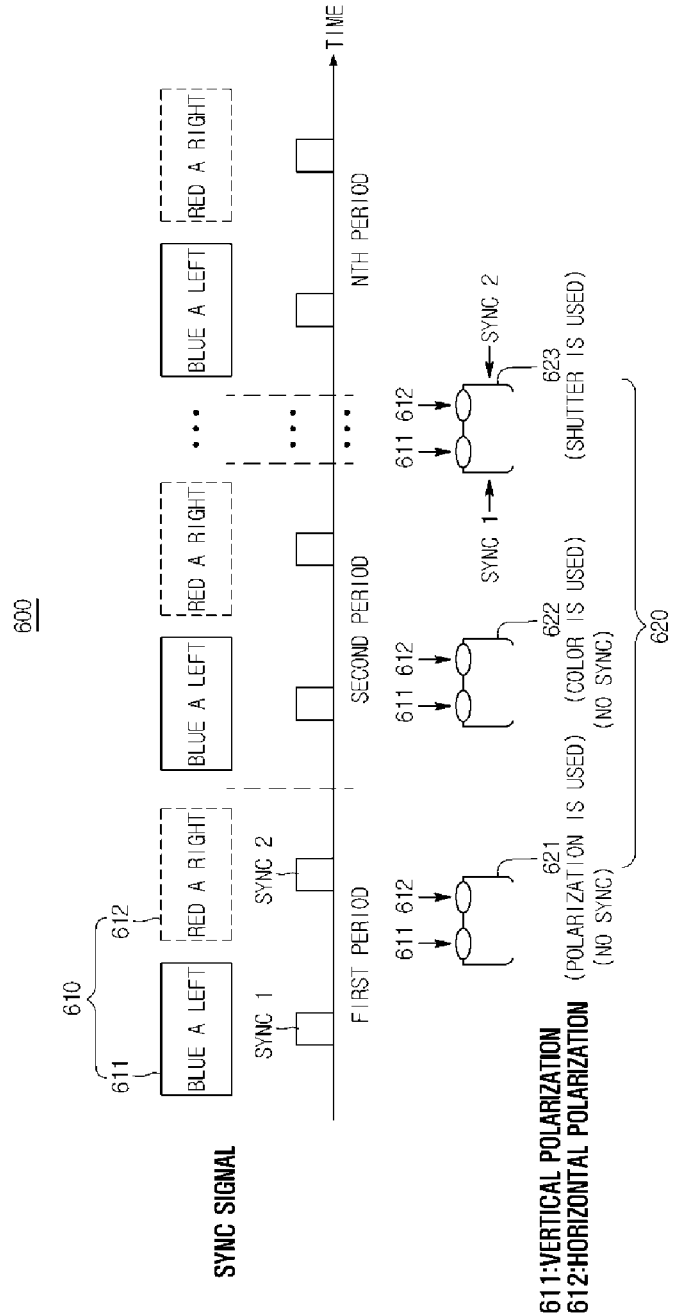

METHOD AND SYSTEM FOR REPRODUCING AND WATCHING A VIDEO

CROSS-REFERENCE TO RELATED APPLICATIONS

This application is the United States national phase under 35 U.S.C. § 371 of International Application No. PCT/KR2012/000201 filed Jan. 9, 2012, entitled "Method and System for Reproducing and Watching a Video" and claims priority under 35 U.S.C. § 119(a)-(d) to Korean Patent Application No. 10-2011-0004515, filed on Jan. 17, 2011, and Korean Patent Application No. 10-2011-0052774, filed on Jun. 1, 2011, in the Korean Intellectual Property Office, the disclosures of which are hereby incorporated by reference in their entireties.

TECHNICAL FIELD

The present invention relates, in general, to a method and system for playing and watching an image and, more particularly, to a method and system for playing and watching an image, which allow a plurality of users to simultaneously watch a 3D image in a two-dimensional (2D) manner or a three-dimensional (3D) manner depending on their preferences when the corresponding 3D image is being played on a display device, or which allow a plurality of users to select different images and simultaneously watch the selected images depending on their preferences when a plurality of 3D images are being played.

BACKGROUND ART

In a case where an image is watched via a display device, such as an existing theater screen, a computer monitor, a television receiver, the liquid crystal display (LCD) screen of a mobile phone, or the screen of a game machine, all viewers who are watching the display device must unconditionally watch only the same image. That is, in the case of a theater screen, for example, when a 3D image is being played on the theater screen, all viewers must wear 3D glasses and watch the 3D image, and cannot watch the same image in a 2D manner. The reason for this is that, in the case of a 3D image, a display device and 3D glasses are set such that a left image is viewed with a left eye and a right image is viewed with a right eye through the 3D glasses, thus making it impossible to watch a 2D image with 3D glasses worn by each viewer, and also making it impossible to view clear images without 3D glasses being worn because both a left image and a right image are simultaneously viewed with left and right eyes. This is a problem present in common among all display devices for playing 3D images using a polarization method, a shutter method, and an anaglyph method.

Further, when a television receiver is set to play an image on a specific channel, all viewers must watch the image on the set channel and cannot simultaneously watch an image on another channel via the same television receiver.

For example, in order to solve the above problem, in conventional technology, such as Korean Patent Registration No. 100757231 entitled "Method and apparatus for simultaneously watching multiple screens on a plurality of channels in a Digital Multimedia Broadcasting (DMB) mobile terminal," the screen of a display device is divided into a main screen and a sub-screen and an image on a specific channel is played on the main screen while an image on another channel is being played on the sub-screen. However, such a scheme is also disadvantageous in that all viewers must watch the same format screen which is divided into the main screen and the sub-screen, and it is impossible for viewers to select only the main screen or the sub-screen and simultaneously watch the selected screen depending on their preferences, and in that a display area is separated into the main screen and the sub-screen and then a viewing experience is deteriorated.

In order to solve the above problem of the conventional technology, Korean Patent Application No. 10-1999-0051191 entitled "Apparatus for simultaneously playing various images" (this has since been extinguished) proposes an apparatus for allowing viewers to select and watch only desired images while simultaneously playing the various images. However, this technology is problematic in that a storage medium in which various types of images are alternately arranged on a frame basis is required, and is also problematic in that an implementation scheme for a sound output means for selectively outputting only the sounds of an image selected by an image selection means is not described, thus making it impossible to check whether this technology is realizable.

Further, Korean Patent Application No. 10-2004-0081180 entitled "Apparatus and method for playing various images (request for examination has not been made)" proposes an apparatus capable of playing various images. However, this technology is problematic in that it must include the step of manufacturing various images while allowing two or more images to alternately emerge on a frame basis, and in that a scheme for operating and implementing a polarization shutter glasses unit required to view various images using a polarizing filter is not described, thus making it impossible to check whether this technology is realizable.

Furthermore, Korean Patent Application No. 10-2004-0085890 entitled "Apparatus for playing two types of images" proposes an apparatus capable of playing various types of images. However, this technology is disadvantageous in that it requires a storage medium in which two types of images are stored in such a way as to arrange a first image in odd fields and a second image in even fields, and is problematic in that a play means for simultaneously playing the images stored in the storage medium is not described in detail, and a detailed implementation scheme for a sound output means for selectively outputting only the sounds of an image selected by an image selection means is not described, thus making it impossible to check whether this technology is realizable.

Meanwhile, a principle by which a 3D image is watched on a display device, such as an existing theater screen, a computer monitor, a television receiver, the LCD screen of a mobile phone, or the screen of a game machine, is that a left-eye image and a right-eye image for the 3D image are displayed using different time synchronization characteristics (hereinafter referred to as a 'time division scheme'), different polarization characteristics (hereinafter referred to as a 'polarization division scheme') or different color characteristics (hereinafter referred to as a 'color division scheme'), and that a viewer wears shutter glasses in the case of the time division scheme, polarized glasses in the case of the polarization division scheme, and colored glasses in the case of the color division scheme, depending on the display schemes, and so only a left-eye image passes through a left-eye lens and only a right-eye image passes through a right-eye lens, thus enabling the 3D image to watched.

In this case, in accordance with the above-described principle for displaying and watching 3D images, all viewers watch the same image. That is, in the case of, for example, a theater screen, when a 3D image is being played on the theater screen, all viewers watch only the corresponding 3D image with 3D glasses worn by the viewers. Further, when a television receiver is set to play an image on a specific channel, all viewers must watch the image on the set channel.

Conventional technology devised to solve this problem includes technology (Korean Patent No. 10-0757231, hereinafter referred to as a 'screen division scheme') for dividing the screen of a display device into a main screen and a sub-screen and playing an image on a specific channel on the main screen while playing an image on another channel on the sub-screen, time-division-based various image playing technology (U.S. Patent Publication No. US 2010/0079585) for displaying different images on the same screen in synchronization with different times, and allowing viewers to wear shutter glasses switched on/off in synchronization with desired images and to watch the desired images, and polarization division- or color division-based various image playing technology (Korean Unexamined Patent Publication No. 2002-0021204 and Japanese Unexamined Patent Publication No. 2007-178582) for displaying different images on the same screen in different polarizations or in different colors and allowing viewers to wear polarized glasses or colored glasses, which are designated to pass only desired images, and to watch the desired images. All of these conventional technologies propose display methods of simultaneously watching a plurality of 2D images, but the screen division scheme is problematic in that a screen is separated into a main screen and a sub-screen, thus deteriorating a viewing experience, and the various image playing technologies based on the time division scheme, the polarization division scheme, and the color division scheme cannot be applied to display methods of simultaneously watching a plurality of 3D images, or simultaneously watching a plurality of 2D and 3D images.

Furthermore, the conventional schemes for watching 3D images are limited in that compatibility between a 3D display device and 3D glasses is decreased, and then only a specific scheme-based display device can be watched using specific scheme-based 3D glasses. That is, by using polarized glasses, only a polarization division-based display device can be watched and other scheme-based display devices cannot be watched, and by using shutter glasses, only a time division-based display device can be watched, and other scheme-based display devices cannot be used to watch 3D images. Further, by using colored glasses, only a color division-based display device can be watched, and other scheme-based display devices cannot be watched.

DISCLOSURE

Technical Problem

Accordingly, the present invention has been made keeping in mind the above problems, and an object of the present invention is to provide a method and system for playing and watching an image, which allow a plurality of users to select a desired image and simultaneously watch the selected image in a 2D or 3D manner depending on their preferences when a 3D image is being played on a display device, such as a theater screen, a computer monitor, a television receiver, the LCD screen of a mobile phone, or the screen of a game machine, and which allow a plurality of viewers to respectively select desired types of images and simultaneously watch the selected images depending on their preferences when various types of images are being played on the display device.

Another object of the present invention is to provide a method and system for playing and watching a 3D image, which play a plurality of 3D images on a display device, and allow a plurality of users to respectively watch different 3D images depending on their preferences.

A further object of the present invention is to provide a method and system for playing and watching a 3D image, which allow a 3D image being played on a single display device to be watched using various types of 3D glasses, such as polarized glasses, shutter glasses, or colored glasses.

Technical Solution

First, when the characteristics of the present invention are summarized, a method of playing and watching an image according to an aspect of the present invention to accomplish the above objects, includes displaying a three-dimensional (3D) image implemented as a combination of a left-eye image and a right-eye image on a screen, providing an assist device enabling the displayed 3D image to be selectively watched in a form of a two-dimensional (2D) image or a 3D image, and passing images through the assist device, wherein the assist device comprises first means for passing an image through a left eye of a user and second means for passing an image through a right eye of the user, wherein the assist device can adjust the images respectively passing through the first means and the second means so that each of the images is any one of the left-eye image and the right-eye image, and wherein passing the images comprises adjusting the assist device so that the images passing through the first means and the second means become an identical image or different images.

The 3D image is displayed on a single screen, or the left-eye image and the right-eye image may be respectively displayed on a plurality of screens installed in an identical area to overlap each other.

The left-eye image and the right-eye image may be simultaneously displayed in different polarizations based on pixels separated on the screen, and adjusting the assist device may include adjusting polarizing directions of the images passing through the first means and the second means.

The left-eye image and the right-eye image may be respectively displayed at periodically separated times, and adjusting the assist device may include the first means and the second means passing the images in synchronization with a time at which any one of the left-eye image and the right-eye image is displayed.

The left-eye image and the right-eye image forming the 3D image may be simultaneously displayed in different colors based on pixels separated on the screen, and adjusting the assist device may include adjusting colors passing through the first means and the second means.

Further, a system for playing and watching an image according to another aspect of the present invention includes a display device for displaying a three-dimensional (3D) image implemented as a combination of a left-eye image and a right-eye image on a screen, and an assist device for enabling the displayed 3D image to be selectively watched in a form of a two-dimensional (2D) image or a 3D image, wherein the assist device comprises first means for passing an image through a left eye of a user, second means for passing an image through a right eye of the user, and an adjustment unit for adjusting the images respectively passing through the first means and the second means so that each of the images is any one of the left-eye image and the right-eye image, and the adjustment unit is adjusted so that the images passing through the first means and the second means become an identical image or different images, thus enabling the displayed 3D image to be watched in the form of the 2D image or the 3D image.

The display device may include a single screen on which the 3D image is displayed, or the 3D image may be displayed in such a way that a plurality of screens for respectively displaying the left-eye image and the right-eye image are installed in an identical area to overlap each other.

The display device may simultaneously display the left-eye image and the right-eye image in different polarizations based on separated pixels, and the adjustment unit may adjust polarizing directions of images passing through the first means and the second means.

The display device may respectively display the left-eye image and the right-eye image at periodically separated times, and the adjustment unit may perform adjustment such that the first means the second means are synchronized with a time at which any one of the left-eye image and the right-eye image is displayed.

The display device may include a synchronization unit for transmitting a synchronization (sync) signal for the periodically separated times, and the assist device may include a communication unit for performing control such that the first means or the second means passes a corresponding image in synchronization with the sync signal while communicating with the synchronization unit.

The display device may simultaneously display the left-eye image and the right-eye image based on pixels separated on the screen in different colors, and the adjustment unit may adjust colors of images passing through the first means and the second means.

The assist device may be manufactured in a form of glasses required to watch the screen using the first means and the second means.

The first means may pass an image, identical to that passed by the second means, of the left-eye image and the right-eye image.

The first means may pass an image, different from that passed by the second means, of the left-eye image and the right-eye image.

Furthermore, an assist device for assisting watching of an image, according to a further aspect of the present invention, is the assist device enabling a 3D image, implemented as a combination of a left-eye image and a right-eye image and displayed on a screen, to be selectively watched in a form of a 2D image or a 3D image, including first means for passing an image through a left eye of a user, second means for passing an image through a right eye of the user, and an adjustment unit for adjusting the images respectively passing through the first means and the second means so that each of the images is any one of the left-eye image and the right-eye image, wherein the adjustment unit is adjusted so that the images passing through the first means and the second means become an identical image or different images, thus enabling the displayed 3D image to be watched in the form of the 2D image or the 3D image.

Furthermore, a method of playing and watching an image according to yet another aspect of the present invention, includes displaying various images, one or more of polarization characteristics, time synchronization characteristics, and color characteristics of which are different, on an identical screen, and allowing a plurality of users to selectively watch only an image based on a specific composite division scheme in which two or more of polarization characteristics, time synchronization characteristics, and color characteristics are combined, among the various images displayed on the screen, by using respective glasses devices.

In this case, the method may further include a scheme configured to allow a plurality of users to respectively watch only images having specific polarization characteristics, time synchronization characteristics, and color characteristics using different glasses devices among various images based on a triple composite division scheme in which all of polarization characteristics, time synchronization characteristics, and color characteristics are combined.

The method may further include a scheme configured to allow a plurality of users to respectively watch only images having specific two characteristics of polarization characteristics, time synchronization characteristics, and color characteristics using different glasses devices among various images based on a dual composite division scheme in which any two of polarization characteristics, time synchronization characteristics, and color characteristics are combined.

The method may further include a scheme configured to display a plurality of images in synchronization with different sync signals, and separately and periodically display the images in left-eye polarization and in right-eye polarization on an identical screen in synchronization with the respective sync signals, and allow different users to watch a single image displayed in corresponding left-eye polarization and right-eye polarization, among the plurality of images using respective glasses devices, each having a left-eye lens and a right-eye lens synchronized with any one of a plurality of sync signals.

The method may further include a scheme configured to periodically and separately display a plurality of images on an identical screen in synchronization with respective sync signals, and respectively display the images in left-eye polarization and right-eye polarization in synchronization with different sync signals, and allow different users to watch a single image displayed in corresponding left-eye polarization and right-eye polarization among the plurality of images using respective glasses devices, each having a left-eye lens and a right-eye lens respectively synchronized with any two of a plurality of sync signals.

The method may further include a scheme configured to periodically and separately display a plurality of images on an identical screen in synchronization with each sync signal in left-eye polarization having different colors and in right-eye polarization having different colors, and separately display another plurality of images on the identical screen in synchronization with another sync signal in left-eye polarization having different colors and right-eye polarization having different colors, and allow different users to watch a single image displayed in left-eye polarization and right-eye polarization having corresponding colors, among the plurality of images using respective glasses devices, each having a left-eye lens and a right-eye lens synchronized with any one of a plurality of sync signals.

The method may further include a scheme configured to periodically and separately display a plurality of images on an identical screen in different polarizations (or colors) in synchronization with each sync signal, and separately display another plurality of images on the identical screen in different polarizations (or colors) in synchronization with another sync signal, allow different users to watch a single image displayed in corresponding polarization (or color), among the plurality of images using respective glasses devices, each having a left-eye lens and a right-eye lens synchronized with any one of a plurality of sync signals.

The method may further include a scheme configured to respectively display an identical image in left-eye polarization (or color) and right-eye polarization in synchronization with different sync signals, and allow different users to watch the image using a glasses device having a left-eye lens and a right-eye lens for left-eye polarization (or color) and right-eye polarization without having sync signals, or a glasses device having a left-eye lens and a right-eye lens, shutters of which are opened in synchronization with any two of a plurality of sync signals.

The method may further include a scheme configured to respectively display an identical image in left-eye polarization and right-eye polarization having different colors in synchronization with different sync signals, allow different users to watch the image using a glasses device having a left-eye lens and a right-eye lens for left-eye polarization and right-eye polarization without having sync signals, a glasses device having a left-eye lens and a right-eye lens having colors for a left eye and a right eye without having sync signals, or a glasses device having a left-eye lens and a right-eye lens, shutters of which are opened in synchronization with any two of a plurality of sync signals.

In addition, a system for playing and watching an image according to still another aspect of the present invention includes a display device for displaying various images, one or more of polarization characteristics, time synchronization characteristics, and color characteristics of which are different, on an identical screen, and a glasses device required to selectively watch only an image based on a specific composite division scheme in which two or more of polarization characteristics, time synchronization characteristics, and color characteristics are combined, among various images displayed on the screen.

Advantageous Effects

In accordance with the method and system for playing and watching an image according to the present invention, a plurality of users can simultaneously watch a 3D image in a 2D or 3D manner depending on their preferences when the corresponding 3D image is being played on a display device.

Further, in accordance with the present invention, a plurality of users can select desired types of images and simultaneously watch the selected images depending on their preferences when various types of images are being played on the same display device.

Furthermore, in accordance with the present invention, a plurality of users can respectively select desired 3D images from a display device on which a plurality of 3D images are being simultaneously displayed in the same screen area, and can watch the selected 3D images.

Furthermore, a 3D image displayed on the same display device can be watched using watching schemes meeting the preferences of viewers, such as polarized glasses, shutter glasses, and colored glasses.

DESCRIPTION OF DRAWINGS

FIG. 9 is a diagram showing a system for playing and watching a plurality of 2D images using polarization characteristics and time synchronization characteristics according to an embodiment of the present invention;
FIG. 10 is a diagram showing a system for playing and watching a single 3D image using polarization characteristics and time synchronization characteristics according to an embodiment of the present invention;
and
FIG. 11 is a diagram showing a system for playing and watching a single 3D image using polarization characteristics, color characteristics, and time synchronization characteristics according to an embodiment of the present invention.

BEST MODE

Figure 1:
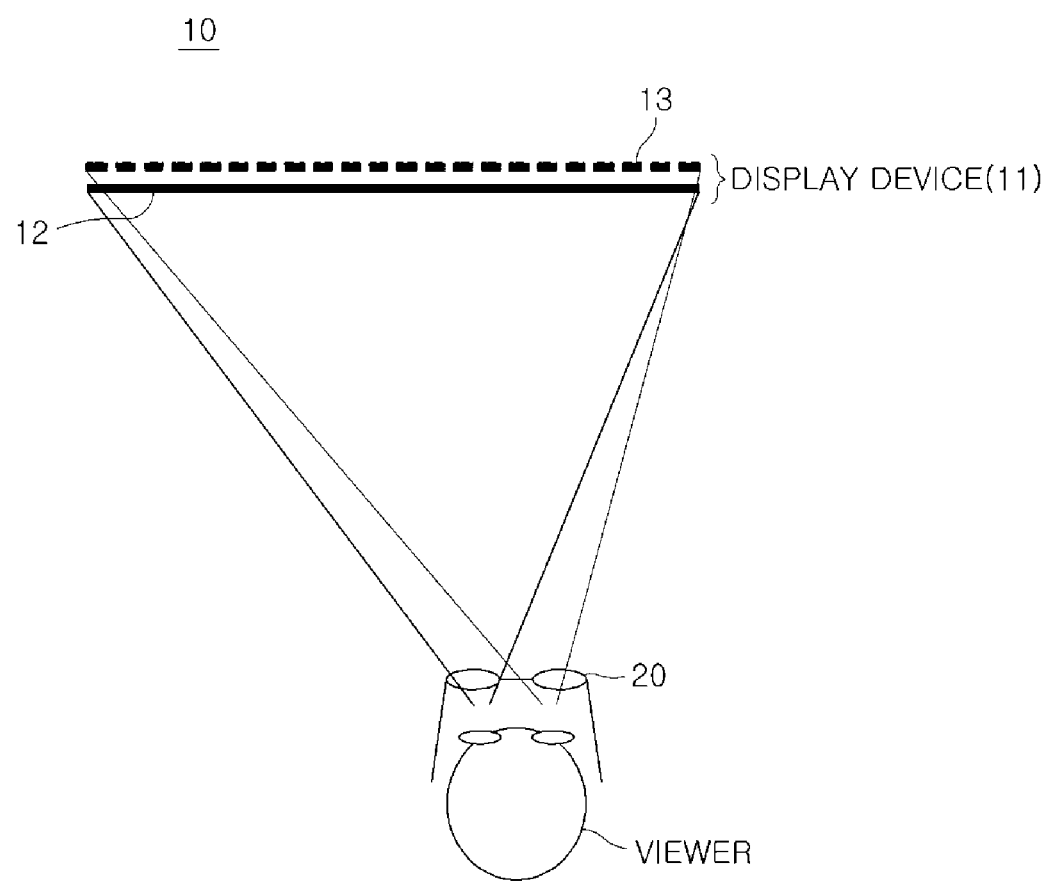
FIG. 1 is a diagram showing a system for playing and watching an image according to an embodiment of the present invention.

FIG. 1 is a diagram showing a system 10 for playing and watching an image according to an embodiment of the present invention.

Referring to FIG. 1, the system 10 for playing and watching an image according to the embodiment of the present invention includes a display device 11 for displaying various images on a screen, and a glasses-type watching-assist device 20 required to watch the various images on the display device 11. Although not shown in the drawing, as will be described later, the display device 11 may further include other devices for a display system, such as a sound device for outputting sound signals respectively corresponding to various images, and may further include a synchronization unit for communicating with the glasses-type watching-assist device 20 upon displaying images in a time division manner. In the present invention, one or more of various images selected from the display device 11 may be watched by adjusting the adjustment unit (see 24 of FIG. 2) of the watching-assist device 20.

For the convenience of illustration, in FIG. 1, a case where the display device 11 displays two types of images, that is, a first image 12 and a second image 13, has been illustrated, but the configuration is not limited thereto, and the present invention is applied even to a case where the display device 11 displays three or more images in the similar manner.

The first image 12 and the second image 13 that can be each composed of text, a still image, a moving image, etc. may be different types of images, and the first image 12 may be an image corresponding to a left-eye image of a 3D image and the second image 13 may be an image corresponding to a right-eye image of the 3D image.

The display device 11 used in the present invention is a display means having a purpose to displays various types of images, and may display the first image 12 and the second image 13 using a polarization scheme in which the first image 12 and the second image 13 are caused to have different polarizations and are simultaneously output, may display the first image 12 and the second image 13 using a time division scheme in which the first and second images 12 and 13 are temporally alternately output, or may display the first image 12 and the second image 13 using a color division scheme in which the first and second images 12 and 13 are simultaneously output in different colors. When more than two images other than two images shown in FIG. 1 are displayed, the polarization-type display may be configured to simultaneously display the images so that the respective images have different polarization characteristics, the time division-type display may be configured to alternately display a plurality of images, and the color division-type display may be configured to display a plurality of images in different colors.

The display device 11 for displaying various images in this way may be implemented by combining panel- or film-type display means, such as a theater screen, or the Cathode Ray Tube (CRT), Liquid Crystal Display (LCD), Light Emitting Diode (LED), or Plasma Display Panel (PDP) display of various types of electronic devices.

For example, on a single screen or the above-described panel- or film-type display means, pixels may be separated and then the first image 12 and the second image 13 may be displayed. Alternatively, a plurality of screens (normal screens or the above-described panel- or film-type display means) on which the first image 12 or the second image 13 is displayed may be installed in the same installation area to overlap each other, thus enabling the images to be displayed on the respective screens of upper and lower plates.

Meanwhile, in FIG. 1, the watching-assist device 20 selects an image desired by a user from among various images simultaneously displayed on the display device 11 and allows the corresponding image to be viewed with the left eye or right eye of the user (including both left and right eyes), thus allowing the user to watch the image.

Figure 2:
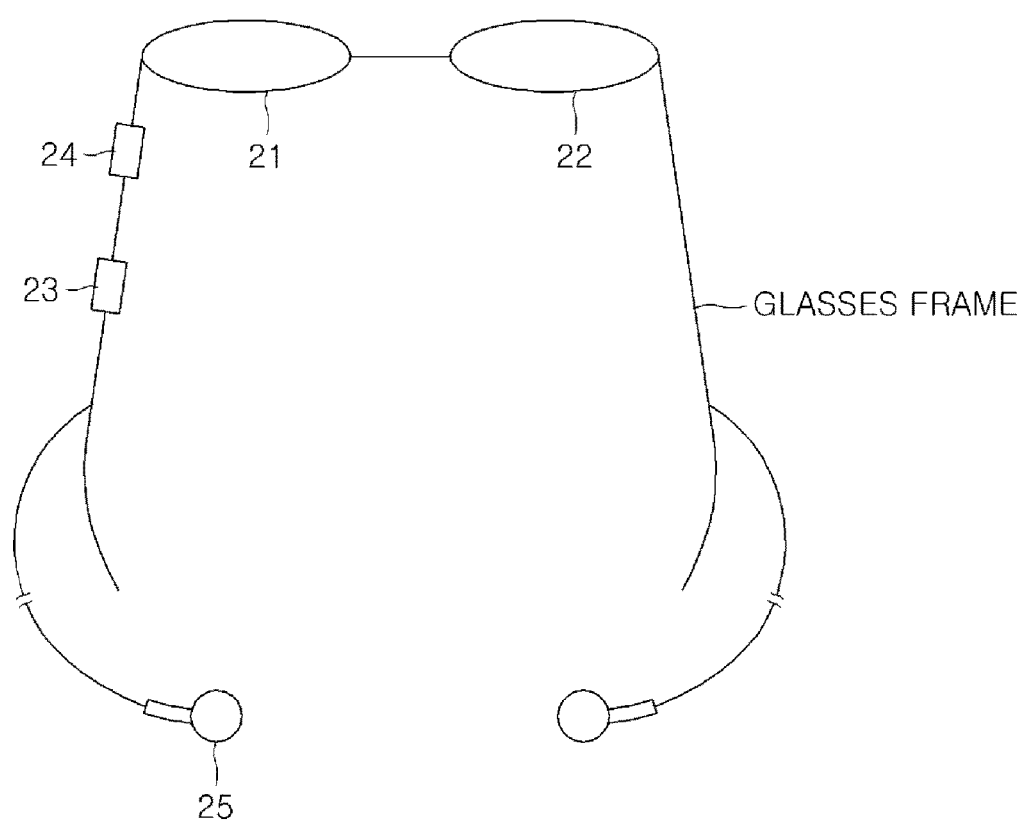
FIG. 2 is a detailed block diagram showing the watching-assist device of FIG. 1.

FIG. 2 is a detailed block diagram showing the watching-assist device 20 of FIG. 1. Referring to FIG. 2, the watching-assist device 20 may be manufactured to be worn over both ears of a user to watch the screen of the display device 11, and may include a left glass 21 for watching an image selected by the user around a left lens and a right glass 22 for watching an image selected by the user around a right lens. In addition to this, the watching-assist device 20 includes an adjustment unit 23 for adjusting the left glass 21 and the right glass 22 so that one or more of various images on the display device 11 can be watched and selected depending on each display scheme (a polarization scheme, a time division scheme, or a color division scheme), a communication unit 24 for receiving sound signals related to the corresponding image being watched from the sound device of the display device 11, and an earphone 25 for outputting the signal signals received by the communication unit 24. The sound device of the display device 11 may transmit sound signals for the various respective images at different frequencies, and the adjustment unit 23 may adjust frequency or the like automatically or manually based on the manipulation of the user's key, button, or the like so that sound signals corresponding to an image currently selected and watched from among various images by the user are received by the communication unit 24. Although such a glasses-type watching-assist device 20 has been described as an example, the watching-assist device 20 is not limited to such an example and may be implemented in other various forms, such as a Head Mounted Device (HMD) form, a form attached to an exclusive audio visual device, or a form enabling watching with the device in hand.

The above watching-assist device 20 described in the present invention may also be configured in a form in which the communication unit 24 and the earphone 25 are omitted from the above-described several components, depending on the schemes for displaying various images. According to the display scheme, when display is performed using the polarization scheme, the left glass 21 and the right glass 22 are implemented as polarizing filters (or polarizing lenses) to be able to select images 12/13 displayed in specific polarizations. Further, when the display device 11 displays images using the time division scheme, the left glass 21 and the right glass 22 are implemented as shutters (or shutter lenses) that are synchronized with periods at which the corresponding images 12/13 are output by the communication unit 24, and that pass only images meeting the corresponding periods and block other images. Furthermore, when the display device 11 displays images using the color division scheme, the left glass 21 and the right glass 22 are implemented as color-rejection filters (or color-rejection lenses) for passing only images having specific colors and blocking images having other colors.

For each of the above display schemes (polarization, time division, or color division), the adjustment unit 23 may adjust polarization characteristics, time synchronization characteristics, or color characteristics for the passing or blocking of the left and right glasses 21 and 22 according to the method of application. For example, by the adjustment unit 23, the left glass 21 and the right glass 22 may be adjusted to pass the images 12/13 with the same characteristics, or to pass the images 12/13 with different characteristics. The communication unit 24 may receive sound signals corresponding to the images 12/13 selected by the left glass 21 and the right glass 22 by adjusting the adjustment unit 23 through the user while communicating with the synchronization unit of the display device 11, and output the corresponding sound signals through the earphone 25, thus allowing the user to listen to the sounds of the corresponding images. When the display device 11 displays images using the time division scheme, the communication unit 24 may receive a synchronization signal required to synchronize alternate display periods of the corresponding images from the synchronization unit of the display device 11, and may perform control such that shutters 21/22 pass the corresponding images. The communication unit 24 may be physically connected to the display device 11 through a cable or the like in a wired manner and configured to receive required signals (sound signal, synchronization signal, etc.), or to receive the required signals (sound signal, synchronization signal, etc.) in a wireless manner. As the wireless manner, universal wireless communication technology, such as infrared communication, Bluetooth, or Zigbee, may be utilized.

Below, operational relations with the watching-assist device 20 depending on the individual display schemes of the display device 11 (polarization, time division, or color division) will be described in more detail.

First, in the polarization scheme, the display device 11 may simultaneously display various images in different polarizations based on pixels separated on the screen by combining display means implemented as a panel- or film-type screen, such as a theater screen, or the CRT, LCD, LED, or PDP display of various types of electronic devices. The display device 11 may display various images having different polarization characteristics by separating pixels on a single screen, or may also display individual images constituting various images having different polarization characteristics by separating pixels via a plurality of screens installed in the same area to overlap each other.

Figure 3:
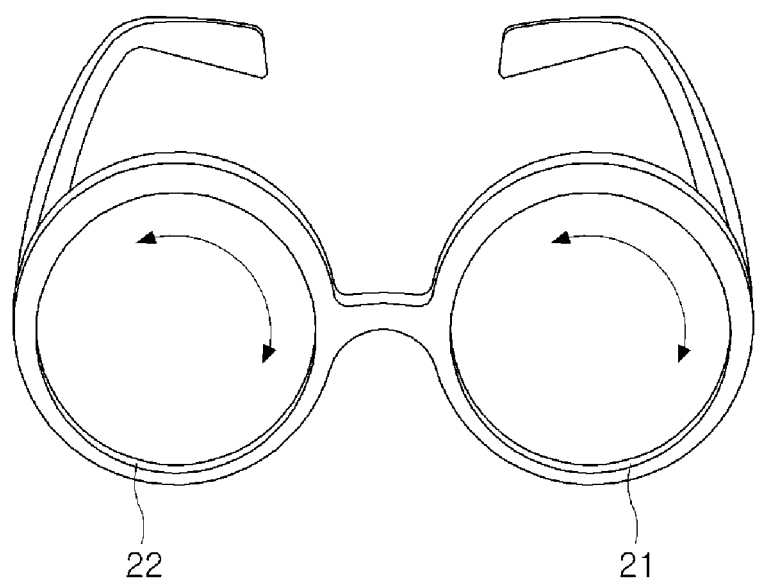
FIG. 3 is a diagram showing the operation of left/right filters of FIG. 2.

As shown in FIG. 3, the polarizing filters (or lenses) of the left glass 21 and the right glass 22 may be configured in the form of films, and the polarizing filters of the left glass 21 and the right glass 22 may be adjusted to pass only images having specific polarizations by respectively rotating the polarizing films of the left glass 21 and the right glass 22 using the predetermined rotation control means (for example, an electronic means such as a button, a mechanical means using a bolt and a belt, and a manual means such as a handle) of the adjustment unit 23. Alternatively, the polarizing filters (or lenses) of the left glass 21 and the right glass 22 may be implemented as polarizing liquid crystal plates. In this case, left/right polarizing liquid crystal plates may pass only images having specific polarizations by adjusting the polarizing liquid crystal plates using the predetermined electronic button or the like of the adjustment unit 23.

When the polarization-type watching-assist device 20 shown in FIG. 3 is used, the user may select images 12/13 having the corresponding specific polarizations by adjusting the polarization characteristics of the polarizing filters (or lenses) of the left glass 21 and the right glass 22 through the adjustment unit 23. For example, the user may perform adjustment such that both the polarizing filter (or lens) of the left glass 21 and the polarizing filter (or lens) of the right glass 22 pass images displayed in vertical polarization, or such that both the polarizing filters (or lenses) of the left glass 21 and the right glass 22 pass images displayed in horizontal polarization. Furthermore, adjustment may be performed such that the polarizing filters (or lenses) of the left glass 21 and the right glass 22 pass images displayed in vertical polarization and in horizontal polarization, respectively. For example, when the first image 12 of FIG. 1 is displayed in vertical polarization and the second image 13 is displayed in horizontal polarization, the user may watch the first image 12 if both the polarizing filters (or lenses) of the left glass 21 and the right glass 22 are adjusted to pass only vertically polarized light. Further, the user may watch the second image 13 if the polarizing filters (or lenses) of the left glass 21 and the right glass 22 are adjusted to pass only horizontally polarized light.

Further, among the various images on the display device 11, an image displayed in any one polarization may be watched with the left eye of the user through the polarizing filter (or lens) of the left glass 21, and among the various images on the display device 11, an image displayed in another polarization may be watched with the right eye of the user through the polarizing filter (or lens) of the right glass 22. For example, when the first image 12 of FIG. 1 is obtained by displaying the left-eye image of a 3D image in vertical polarization, and the second image 13 is obtained by displaying the right-eye image of the 3D image in horizontal polarization, the user may watch the 3D image if the user adjusts the polarization filter (or lens) of the left glass 21 to pass vertically polarized light and adjusts the polarization filter (or lens) of the right glass 22 to pass horizontally polarized light. Furthermore, the user may watch a 2D image if the user adjusts both the polarizing filters (or lenses) of the left glass 21 and the right glass 22 to pass only vertically polarized light or only horizontally polarized light.

Meanwhile, in the time division scheme, the display device 11 may display various images at periodically separated times on a single screen by using display means implemented as a panel- or film-type screen, such as a theater screen, or the CRT, LCD, LED, or PDP display of various types of electronic devices. The display device 11 may also display different types of images at periodically separated times on the single screen. Further, the display device 11 may also separate pixels using a plurality of screens installed to overlap each other in the same area and may display different types of images at periodically separated times, respectively.

In the case of the time division-type display, the user may adjust a synchronization method for the shutters of the left glass 21 and the right glass 22 through the adjustment unit 23. For example, the user may adjust the synchronization method through the predetermined selection means of the adjustment unit 23 such that the shutters of the left glass 21 and the right glass 22 have the same synchronization characteristics, or such that the shutters of the left glass 21 and the right glass 22 have different synchronization characteristics. For example, when, as shown in FIG. 1, the first image 12 and the second image 13 are alternately displayed at predetermined periods, the user may adjust both the shutters of the left glass 21 and the right glass 22 so that they are synchronized with the display time of the first image 12, thus enabling the first image 12 to be watched. Further, the user may adjust both the shutters of the left glass 21 and the right glass 22 so that they are synchronized with the display time of the second image 13, thus enabling the second image 13 to be watched.

For this operation, the synchronization unit (not shown) of the display device 11 may transmit a synchronization (sync) signal for separated times of various images, and the communication unit 24 of the watching-assist device 20 may perform control such that the shutter of the left glass 21 or the right glass 22 passes the corresponding image in synchronization with the sync signal while communicating with the synchronization unit of the display device 11 in a wired or wireless manner. For example, the synchronization unit of the display device 11 may transmit a sync signal, which is periodically activated in synchronization with the display time of each of the various images, in a wired or wireless manner, and the shutter of the left glass 21 or the right glass 22 may open and close a predetermined cover (shade) in synchronization with each sync signal under the control of the communication unit 24, thus passing or blocking the corresponding image. As shown in FIG. 1, although a configuration has been described in which, for two images, the synchronization unit of the display device 11 transmits separate sync signals, which are synchronized with respective display times and are periodically activated, in a wired or wireless manner, and in which the communication unit 24 receives the sync signals and controls the shutters at the display times of the respective images, the present invention is not limited to such a configuration, and the synchronization unit of the display device 11 may transmit separate sync signals enabling the communication unit 24 to separate individual display times in a wired or wireless manner even for three or more images.

Furthermore, any one of various images on the display device 11 is caused to pass through the shutter of the left glass 21 in synchronization with the display time of the corresponding image, thus enabling the corresponding image to be watched with the user's left eye, and another image of the various images on the display device 11 is caused to pass through the shutter of the right glass 22 in synchronization with the display time of the other image, thus enabling the image to be watched with the user's right eye. For example, when the first image 12 of FIG. 1 is a left-eye image of a 3D image, the second image 13 is a right-eye image of the 3D image, and they are alternately displayed at regular periods, the left-eye image may be synchronized with the display time of the left-eye image by the user adjusting the shutter of the left glass 21, or the right-eye image may be synchronized with the display time of the right-eye image by the user adjusting the shutter of the right glass 22, thus allowing the user to watch the 3D image. Furthermore, the user may also watch a 2D image by selecting both the shutters of the left glass 21 and the right glass 22 using the predetermined selection means of the adjustment unit 23 so that both the shutters are synchronized with the display time of the left-eye image or the right-eye image.

On the other hand, in the color division scheme, the display device 11 may simultaneously display various images in different colors based on pixels separated on a screen by combining display means implemented as a panel or film-type screen, such as the theater screen, or the CRT, LCD, LED, or PDP screen of various types of electronic devices. The display device 11 may display various images having different polarization characteristics by separating pixels on a single screen, or may also display individual images constituting various images having different polarization characteristics by separating pixels via a plurality of screens installed in the same area to overlap each other.

In the case of the color division-type display, the user may select the color-rejection filters of the left glass 21 and the right glass 22 using the predetermined selection means of the adjustment unit 23. The predetermined selection means of the adjustment unit 23 may be, for example, an electronic means such as a button, a mechanical means such as a bolt and a belt, or a manual means such as a handle, and enables the color-rejection filters of the left glass 21 and the right glass 22 to be replaced in various manners.

If the watching-assist device 20 required to watch such color division-type images is used, the user may watch a specific image by adjusting the characteristics of the color-rejection filters of the left glass 21 and the right glass 22. For example, when the first image 12 of FIG. 1 is displayed using red light and the second image 13 is displayed using blue light, the user may watch the first image 12 by performing adjustment such that both the color-rejection filters of the left glass 21 and the right glass 22 block the blue light using the predetermined selection means of the adjustment unit 23. Further, the user may watch the second image 13 by performing adjustment such that both the color-rejection filters of the left glass 21 and the right glass 22 block the red light.

Furthermore, by blocking a color corresponding to any one of various images on the display device 11 through the color-rejection filter (or lens) of the left glass 21, an image may be watched using color(s) that are not blocked, and by blocking a color corresponding to another one of various images on the display device 11 through the color-rejection filter (or lens) of the right glass 22, an image may be watched with the user's right eye using color(s) that are not blocked. For example, when the first image 12 of FIG. 1 is a left-eye image of a 3D image and is displayed using red light, and the second image 13 is a right-eye image of the 3D image and is displayed using blue light, the user may watch the 3D image by adjusting color-rejection filters such that the color-rejection filter of the left glass 21 blocks the blue light to pass only the left-eye image, and such that the color-rejection filter of the right glass 22 blocks the red light to pass only the right-eye image. Further, in this case, the user may also watch a 2D image by adjusting the color-rejection filters such that the color-rejection filters of the left glass 21 and the right glass 22 block the same color light.

Figure 4:
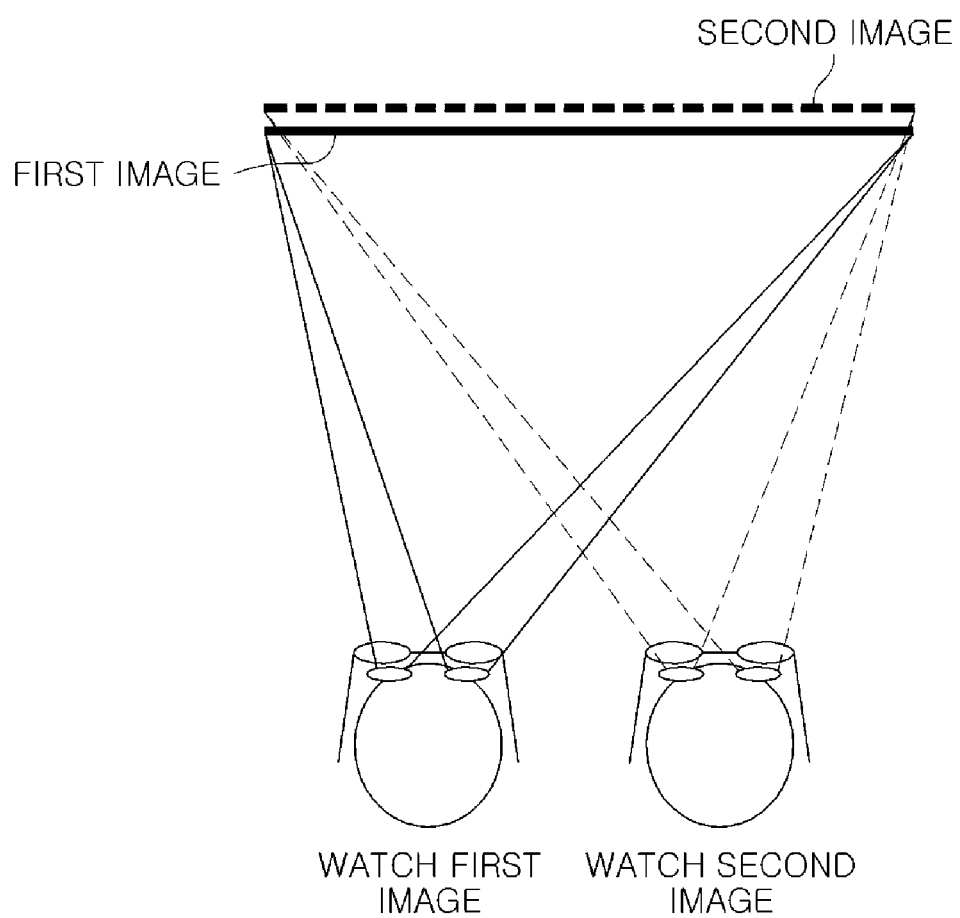
FIG. 4 illustrates an example in which two viewers watch different images.

FIG. 4 is a diagram showing an example in which two viewers watch different images. As shown in FIG. 4, a plurality of viewers may simultaneously watch their desired images from among various types of images that are being displayed on the same display device by using the display device 11 and the watching-assist device 20 according to the present invention. For the convenience of illustration, FIG. 4 illustrates only two types of images, that is, a first image and a second image, but it is apparent that the principle of the present invention can also be applied to a plurality of images in the similar manner. Further, for the convenience of description, FIG. 4 illustrates only a first user and a second user, but it is apparent that the principle of the present invention can also be applied to more users in the similar manner. Here, the first image and the second image may be simultaneously displayed using the above-described polarization scheme, time division scheme, or color rejection scheme depending on the characteristics of the display device. A user may watch a display corresponding to each scheme using the watching-assist device 20 which assists watching based on the polarization scheme, shutter scheme, or color-rejection scheme depending on the characteristics of the display device based on each scheme. In the example shown in FIG. 2, the user may adjust the characteristics of left and right glasses using the adjustment unit 23 of the watching-assist device 20 depending on his or her preference, thus enabling an image suitable for the characteristics of the corresponding display scheme to pass through the glasses. That is, in the case of the polarization scheme, the left and right glasses of the watching-assist device 20 may be adjusted to pass only light having specific polarization characteristics, in the case of the shutter scheme, the synchronization of shutters may be adjusted so that left and right glasses of the watching-assist device 20 pass light only at specific periods, and in the case of color rejection scheme, color-rejection filters may be adjusted such that the left and right glasses of the watching-assist device 20 block only light in specific color. For example, when a first image is displayed in vertical polarization, and a second image is displayed in horizontal polarization, a first user may watch the first image by adjusting the polarizing filters (or lenses) of the left/right glasses of the watching-assist device 20 to pass only vertically polarized light. Further, simultaneously with this, a second user may watch the second image by adjusting the polarizing filters (or lenses) of the left/right glasses of the watching-assist device 20 to pass only horizontally polarized light. In this way, the first user and the second user may simultaneously watch different images using the same display device. As described above, even in the time division scheme or the color-rejection scheme, respective users may watch different images using a principle similar to that of the polarization scheme.

Figure 5:
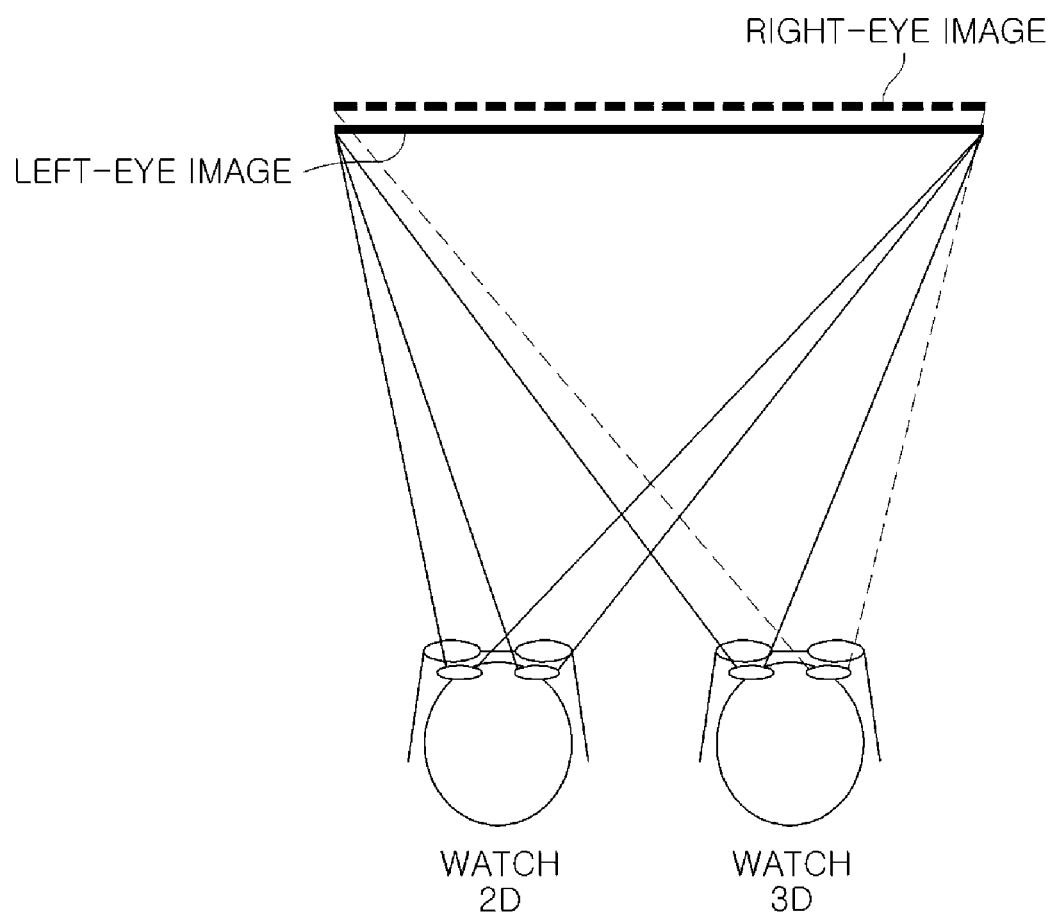
FIG. 5 illustrates an example in which two viewers watch an image in 2D and 3D manners, respectively.

FIG. 5 is a diagram showing an example in which two viewers watch images in a 2D manner and a 3D manner. As shown in FIG. 5, two or more users may simultaneously watch a 3D image that is being displayed on the same display device in a 2D or 3D manner depending on their preferences using the display device 11 and the watching-assist device 20 according to the present invention. For the convenience of description, FIG. 5 illustrates only a first user and a second user, but it is apparent that the principle of the present invention can be applied to a plurality of users. A left-eye image and a right-eye image may be simultaneously displayed using a polarization scheme, a time division scheme or a color scheme, depending on the characteristics of the display device. Each user may watch the display corresponding to each scheme using the watching-assist device 20 which assists the watching of a polarization-type display, a shutter-type display or a color-rejection-type display depending on the characteristics of the display device based on each scheme. In the example shown in FIG. 2, each user may perform adjustment such that a left-eye image passes through only the left glass 21 of the watching-assist device 20 or such that a right-eye image passes through only the right glass 22 of the watching-assist device 20 by adjusting the characteristics of the left/right glasses through the adjustment unit 23 of the watching-assist device 20 depending on his or her preference. Alternately, each user may perform adjustment so that left and right glasses of the watching-assist device 20 have the same characteristics and only an image having specific characteristics, of a left-eye image and a right-eye image, passes through the glasses. That is, in the case of the polarization-type display, adjustment may be performed such that the left and right glasses of the watching-assist device 20 pass only light having different polarization characteristics or such that both the glasses respectively pass only light having the corresponding polarization characteristics. In the case of the shutter-type display, the switching on/off times of the shutters of two glasses may be differently adjusted so that the left/right glasses of the watching-assist device 20 alternately pass light, or may be equally selected so that both the glasses pass light at the same times. In the case of the color rejection-type display, adjustment may be performed such that the left/right glasses of the watching-assist device 20 have different color-rejection filters so as to block light components of different colors or such that both the glasses block the light components of the same color. For example, it is assumed that a left-eye image is displayed in vertical polarization, and a right-eye image is displayed in horizontal polarization. The first user may watch only a left-eye image if vertically polarized light is caused to pass through both the left and right glasses of the watching-assist device 20 by adjusting the polarizing filters (or lenses) of the left/right glasses of the watching-assist device 20. That is, the first user may watch a 2D image. Further, simultaneously with this, a second user may watch a 3D image if only vertically polarized light is caused to pass through the left glass 21 and only horizontally polarized light is caused to pass through the right glass 22 by adjusting the polarizing filters (or lenses) of the left/right glasses of the watching-assist device 20. In this way, the first user and the second user may respectively and simultaneously watch a 2D image and a 3D image using the same display device. As also described above, even in the time division scheme or color-rejection scheme, respective users may watch different 2D or 3D images using the similar principle.

Meanwhile, a system 100/200/300/400/500/600 for playing and watching an image according to the present invention includes a display device 110/210/310/410/510/610 for displaying various images, one or more of polarization characteristics, time synchronization characteristics, and color characteristics of which are differently designated, on the same screen, and a glasses device 120/220/320/420/520/620 used to selectively watch only an image based on a specific composite division scheme in which two or more of polarization characteristics, time synchronization characteristics, and color characteristics are combined, among various images displayed on the screen of the display device. The audio output of each of the various images during the displaying of the display device may be designed in such a way that an earphone provided in the glasses device, or a separate earphone, a headphone, or the like communicates with a predetermined speaker system in a wired or wireless manner, and receives and outputs the corresponding audio information.

For convenience of description, it is assumed that polarization characteristics are classified into vertical polarization and horizontal polarization, time synchronization characteristics are classified into a first sync and second sync, and color characteristics are classified into blue light and red light. Depending on the circumstances, the polarization characteristics may be further classified into a plurality of characteristics, such as 45°-polarization and 135°-polarization. The time synchronization characteristics may be further classified into a plurality of characteristics, such as a third sync and a fourth sync. In addition, the color characteristics may also be further classified into a plurality of characteristics other than blue light and red light.

The polarization division scheme is a scheme in which the display device displays images on the screen so that each image has specific polarization characteristics, such as vertical polarization or horizontal polarization. The time division scheme is a scheme in which the display device displays each image on the screen only in a specific sync interval, such as in a first sync or a second sync. The color division scheme is a scheme in which the display device displays each image on the screen using light having a specific color, such as blue light or red light.

As also described above, existing technologies disclose technology for displaying 3D images or various 2D images using a polarization division scheme, a time division scheme or a color division scheme. Meanwhile, a scheme for displaying images on the display device according to the present invention is a scheme for displaying images using a composite division scheme in which two or more of a polarization division scheme for separately displaying various images using various polarization characteristics, a time division scheme for separately displaying various images using various time synchronization characteristics, and a color division scheme for separately displaying various images using various color characteristics are combined. That is, the display device of the present invention displays an image in synchronization with a specific sync signal using light corresponding to specific polarization and specific color, or displays an image using a composite division scheme in which two or more of the above-described three types of characteristics are combined.

In order for a plurality of users to simultaneously watch different 3D images, the display device of the present invention may display various images based on a triple composite division scheme, in which all of polarization characteristics, time synchronization characteristics, and color characteristics are combined, on the same screen, or may display various images based on a dual composite division scheme, in which any two of polarization characteristics, time synchronization characteristics, and color characteristics are combined, on the same screen. Accordingly, in order for a plurality of users to simultaneously watch different 3D images, respective glasses devices are utilized to enable only images having specific polarization characteristics, time synchronization characteristics, and color characteristics, among various types of images displayed using the triple composite division scheme, to be respectively watched or, alternatively, to enable only images having specific two of characteristics of polarization characteristics, time synchronization characteristics, and color characteristics, among various images displayed using the dual composite division scheme, to respectively watched.

In this way, the display device 110/210/310/410/510/610 for displaying various images on the same screen may be implemented by combining a panel or (fluoroscopic) film-type display means, such as a theater screen, or the CRT, LCD, LED, or PDP screen of various types of electronic devices. For example, pixels may be separated on a single screen or the above-described panel or (fluoroscopic) film-type display means and then different images may be displayed in the same screen area or, alternatively, a plurality of screens, each displaying a single image (screen or the above-described panel or fluoroscopic film-type display means), may be installed in the same installation area to overlap each other, and then respective images may be displayed in the same screen area in which the screens overlap each other.

Hereinafter, a method of operating the system for playing and watching an image according to the present invention will be described in detail with reference to FIGS. 6 to 11.

Figure 6:
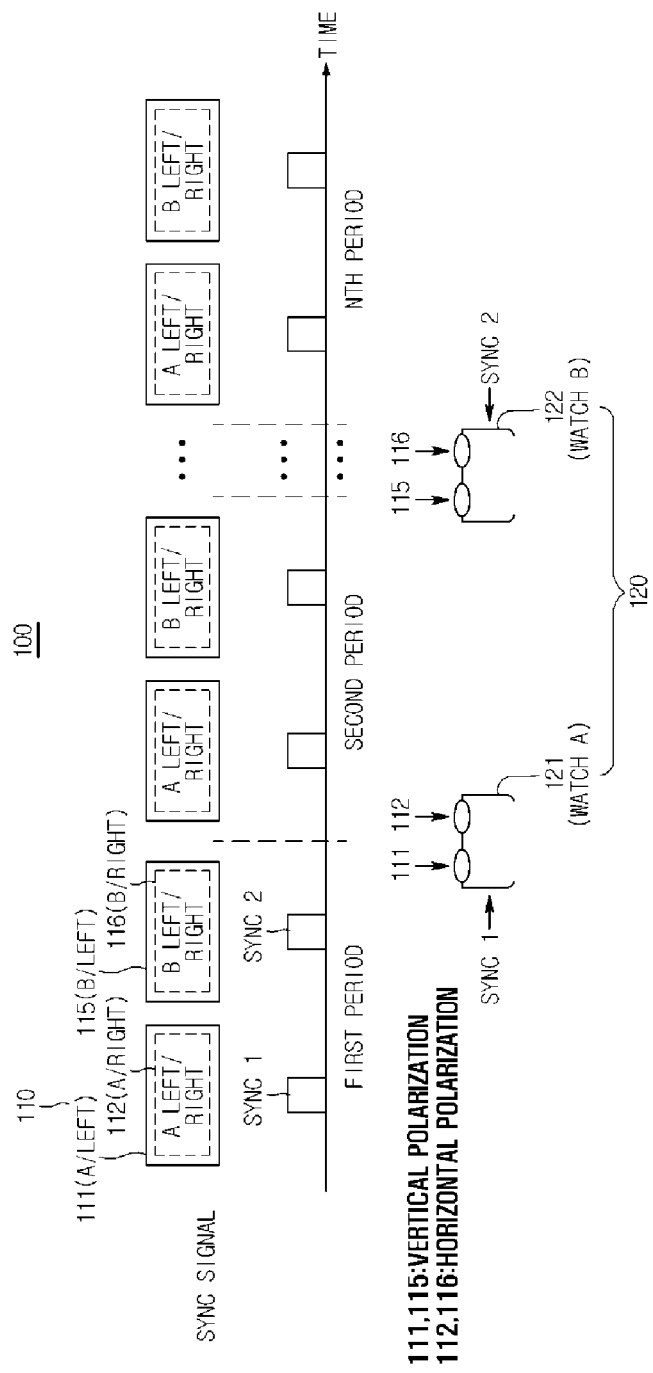
FIG. 6 is a diagram showing a system for playing and watching a plurality of 3D images using polarization characteristics and time synchronization characteristics according to an embodiment of the present invention.

FIG. 6 is a diagram showing a system 100 for playing and watching a plurality of 3D images using polarization characteristics and time synchronization characteristics according to an embodiment of the present invention.

Referring to FIG. 6, the image playing and watching system 100 according to the present invention includes a display device 110 for displaying a plurality of images A and B in synchronization with different sync signals SYNC1 and SYNC2, and separately and periodically displaying the images on the same screen using left-eye polarization and right-eye polarization (for example, vertical polarization and horizontal polarization) in synchronization with the respective sync signals SYNC1/SYNC2, and a glasses device 120 having a left-eye lens and a right-eye lens synchronized with any one of the plurality of sync signals SYNC1 and SYNC2. Each of different users may watch a single image A/B, which is synchronized with the corresponding sync signal and displayed in left-eye polarization and right-eye polarization, of a plurality of images A and B, using his or her own glasses device 121/122. Here, other images displayed in synchronization with other sync signals on the display device 110 may be further displayed so that other users can additionally watch other images.

FIG. 6 illustrates a case where the display device 110 displays a plurality of 3D images A/B in the same screen area using a dual composite division scheme, in which a polarization division scheme and a time division scheme are combined. The display device 110 may display, on the same screen, a left-eye image 111 of 3D image A using the characteristics of vertical polarization-first sync SYNC1, display a right-eye image 112 of the 3D image A using the characteristics of horizontal polarization-first sync SYNC1, display a left-eye image 115 of 3D image B using the characteristics of vertical polarization-second sync SYNC2, and display a right-eye image 116 of the 3D image B using the characteristics of horizontal polarization-second sync SYNC2. In this case, viewer 'a' may watch 3D image A by adjusting a polarization plane and a shutter glass so that the left-eye lens of the glasses device 121 passes only the image 111 having the characteristics of vertical polarization-first sync SYNC1, and by adjusting a polarization plane and a shutter glass so that the right-eye lens of the glasses device 121 passes only the image 112 having the characteristics of horizontal polarization-first sync SYNC1. The other viewer 'b' may watch 3D image B by adjusting a polarization plane and a shutter glass so that the left-eye lens of the glasses device 122 passes only the image 115 having the characteristics of vertical polarization-second sync SYNC2, and by adjusting a polarization plane and a shutter glass so that the right-eye lens of the glasses device 122 passes only the image 116 having the characteristics of horizontal polarization-second sync SYNC2.

Here, the glasses devices 121/122 may receive respective sync signals SYNC1/SYNC2 in a wired or wireless communication manner through the display device 110 or an external control device. As each user selects an image using the predetermined adjustment means of the glasses device 121/122, polarization planes and shutter glasses provided in the corresponding glasses device are operated in synchronization with the corresponding sync signal, and so the user can watch only specific image A/B passing through the corresponding polarization planes when the shutter glasses are opened.

Figure 7:
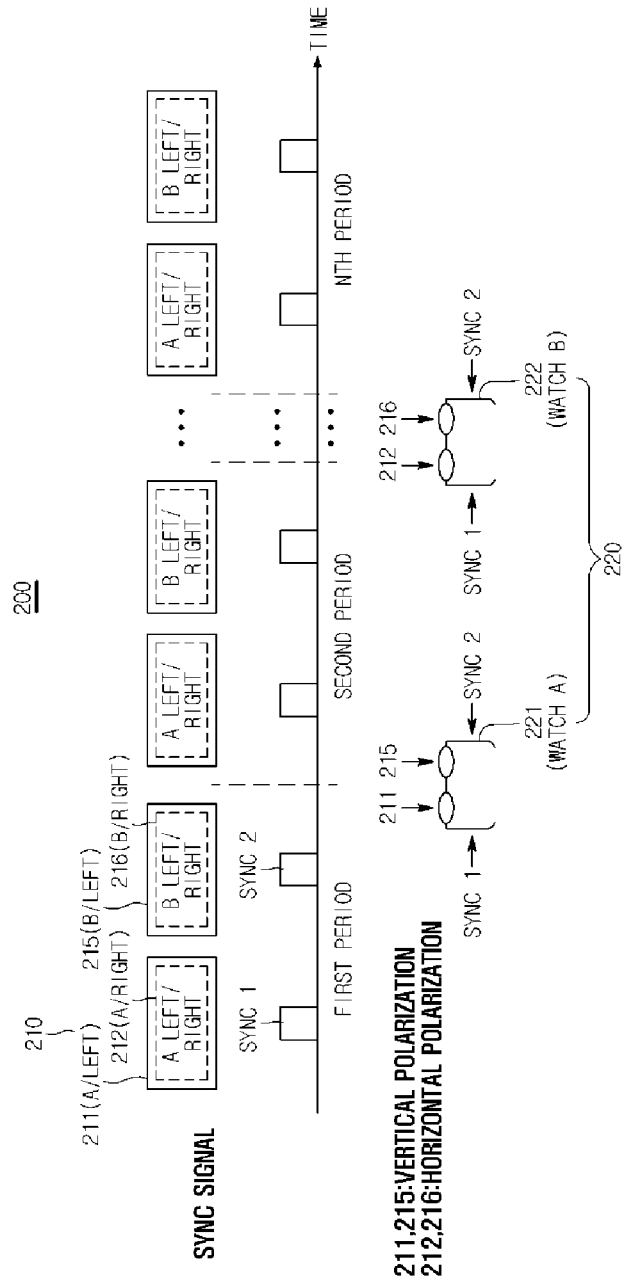
FIG. 7 is a diagram showing another system for playing and watching a plurality of 3D images using polarization characteristics and time synchronization characteristics according to an embodiment of the present invention.

FIG. 7 is a diagram showing another system 200 for playing and watching a plurality of 3D images using polarization characteristics and time synchronization characteristics according to an embodiment of the present invention.

Referring to FIG. 7, the image playing and watching system 200 according to the present invention includes a display device 210 for periodically and separately displaying a plurality of images A and B on the same screen in synchronization with respective sync signals SYNC1/SYNC2, and respectively displaying the images in left-eye polarization and right-eye polarization (for example, vertical polarization and horizontal polarization) in synchronization with different sync signals SYNC1 and SYNC2, and a glasses device 220 having a left-eye lens and a right-eye lens respectively synchronized with any two of a plurality of sync signals (more sync signals other than SYNC1 and SYNC2 may be present). Each of different users may watch a single image displayed in the corresponding left-eye and right-eye polarization, of a plurality of images A and B, using his or her glasses device 221/222. Here, other images displayed in synchronization with other sync signals on the display device 210 may be further displayed so that other users can additionally watch other images.

FIG. 7 illustrates a case where the display device 210 displays a plurality of 3D images in the same screen area using a dual composite division scheme, in which a polarization division scheme and a time division scheme are combined. The display device 210 displays, on the same screen, a left-eye image 211 of 3D image A using the characteristics of vertical polarization-first sync SYNC1, displays a right-eye image 215 of the 3D image A using the characteristics of vertical polarization-second sync SYNC2, displays a left-eye image 212 of 3D image B using the characteristics of horizontal polarization-first sync SYNC1, and displays a right-eye image 216 of the 3D image B using the characteristics of horizontal polarization-second sync SYNC2. In this case, viewer 'a' desiring to watch the 3D image A/B may watch the 3D product A by performing adjustment such that the left-eye lens of the glasses device 221 passes only the image 211 having the characteristics of vertical polarization-first sync SYNC1 and such that the right-eye lens passes only the image 215 having the characteristics of vertical polarization-second sync SYNC2. Further, viewer 'b' may watch the 3D image B by performing adjustment such that the left-eye lens of the glasses device 222 passes only the image 212 having the characteristics of horizontal polarization-first sync SYNC1 and such that the right-eye lens passes only the image 216 having the characteristics of horizontal polarization-second sync SYNC2.

Here, the glasses devices 221/222 may receive respective sync signals SYNC1 and SYNC2 in a wired or wireless communication manner through the display device 210 or an external control device. As each user selects an image using the predetermined adjustment means of the glasses device 221/222, polarization planes and shutter glasses provided in the corresponding glasses device are operated in synchronization with the corresponding sync signals, and so the user can watch only specific image A/B passing through the corresponding polarization planes when the shutter glasses are opened.

In addition, even in a case where the display device displays a plurality of 3D images in the same screen area using a dual composite division scheme in which a polarization division scheme and a color division scheme are combined, or in which a time division scheme and a color division scheme are combined, left-eye images and right-eye images of the respective 3D images are displayed to have different characteristics, and the left-eye lens and the right-eye lens of the glasses devices are caused to pass only images having specific characteristics, thus allowing different users to simultaneously watch specific 3D images.

Figure 8:
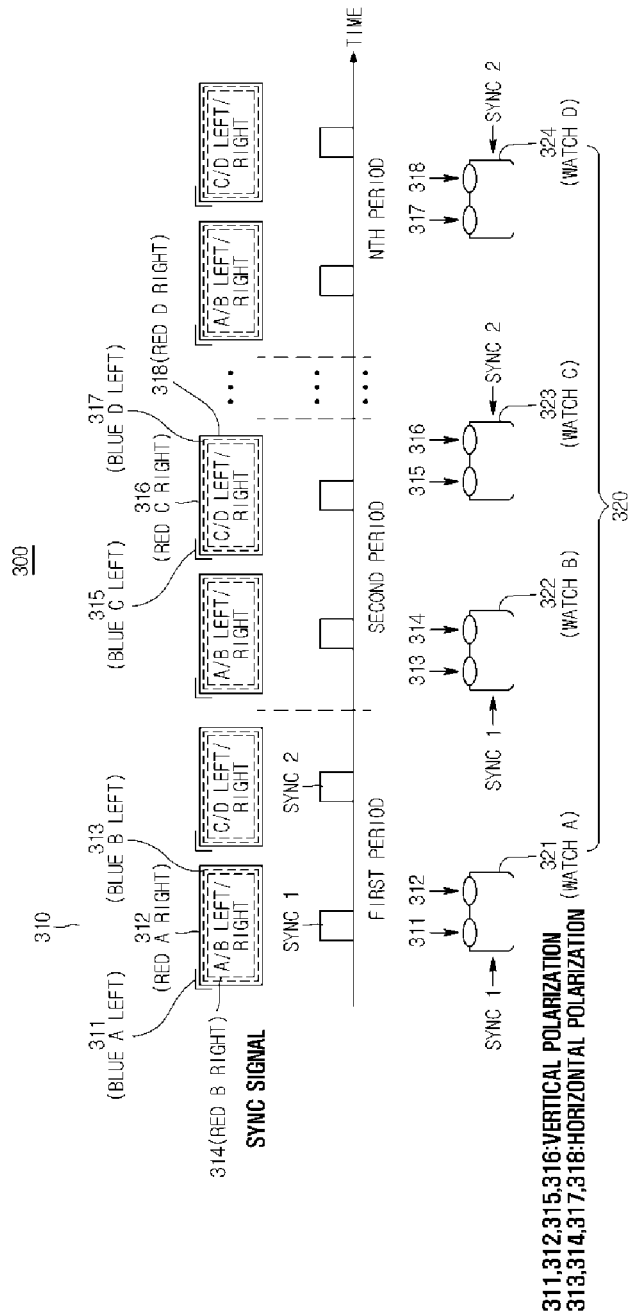
FIG. 8 is a diagram showing a system for playing and watching a plurality of 3D images using polarization characteristics, color characteristics, and time synchronization characteristics according to an embodiment of the present invention.

FIG. 8 is a diagram showing a system 300 for playing and watching a plurality of 3D images using polarization characteristics, color characteristics, and time synchronization characteristics according to an embodiment of the present invention.

Referring to FIG. 8, the image playing and watching system 300 according to the present invention includes a display device 310 for separately and periodically displaying, on the same screen, a plurality of images A and B using left-eye polarizations having different colors and right-eye polarizations having different colors in synchronization with each sync signal SYNC1/SYNC2, and separately displaying, on the same screen, a plurality of different images C and D in synchronization with another sync signal SYNC1/SYNC2 using left-eye polarizations having different colors and right-eye polarizations having different colors, and a glasses device 320 for having a left-eye lens and a right-eye lens, which are synchronized with any one sync signal SYNC1/SYNC2 of a plurality of sync signals (more sync signals other than SYNC1 and SYNC2 may be present). Each of different users may watch one image A/B/C/D, displayed in left-eye polarization and right-eye polarization having the corresponding colors, among a plurality of images A and B or another plurality of images C and D, by using his or her own glasses device 321/322/323/324. Here, other images displayed in synchronization with other sync signals on the display device 310 may be further displayed so that other users can additionally watch other images.

FIG. 8 illustrates a case where the display device 310 displays a plurality of 3D images in the same screen area using a triple composite division scheme in which a polarization division scheme, a time division scheme, and a color division scheme are combined, and each 3D image is displayed by differently setting one or more of polarization characteristics, time synchronization characteristics, and color characteristics of a left-eye image and a right-eye image of the 3D image. The glasses device 320 may enable a specific 3D image to be watched by allowing the left-eye lens and the right-eye lens to pass only images having specific characteristics.

As shown in FIG. 8, a left-eye-image 311 of 3D image A may be displayed using the characteristics of vertical polarization-blue light-first sync SYNC1, a right-eye-image 312 of the 3D image A may be displayed using the characteristics of vertical polarization-red light-first sync SYNC1, a left-eye image 313 of 3D image B may be displayed using the characteristics of horizontal polarization-blue light-first sync SYNC1, and a right-eye image 314 of the 3D image B may be displayed using the characteristics of horizontal polarization-red light-first sync SYNC1. Further, a left-eye image 315 of 3D image C may be displayed using the characteristics of vertical polarization-blue light-second sync SYNC2, a right-eye image 316 of 3D image C may be displayed using the characteristics of vertical polarization-red light-second sync SYNC2, a left-eye image 317 of 3D image D may be displayed using the characteristics of horizontal polarization-blue light-second sync SYNC2, and a right-eye image 318 of the 3D image D may be displayed using the characteristics of horizontal polarization-red light-second sync SYNC2.

In this case, viewer 'a' who desires to watch a 3D image may watch the 3D image A by performing adjustment such that the left-eye lens of the glasses device 321 passes only the image 311 having the characteristics of vertical polarization-blue light-first sync SYNC1 and such that the right-eye lens thereof passes only the image 312 having the characteristics of vertical polarization-red light-first sync SYNC1. Further, viewer 'b' may watch the 3D image B by performing adjustment such that the left-eye lens passes only the image 313 having the characteristics of horizontal polarization-blue light-first sync SYNC1 and such that the right-eye lens passes only the image 314 having the characteristics of horizontal polarization-red light-first sync SYNC1. Furthermore, viewer 'c' may watch the 3D image C by performing adjustment such that the left-eye lens passes only the image 315 having the characteristics of vertical polarization-blue light-second sync SYNC2 and such that the right-eye lens passes only the image 316 having the characteristics of vertical polarization-red light-second sync SYNC2. Furthermore, viewer 'd' may watch the 3D image D by performing adjustment such that the left-eye lens passes only the image 317 having the characteristics of horizontal polarization-blue light-second sync SYNC2 and such that the right-eye lens passes only the image 318 having the characteristics of horizontal polarization-red light-second sync SYNC2.

In this case, the glasses devices 321/322/323/324 may receive the corresponding sync signal SYNC1/SYNC2 in a wired or wireless communication manner through the display device 310 or an external control device. As each user selects an image using the predetermined adjustment means of the glasses device 321/322/323/324, polarization planes and shutter glasses provided in the corresponding glasses device are operated in synchronization with the corresponding sync signal, and so the user can watch only specific image A/B/C/D passing through the corresponding polarization planes or color planes when the shutter glasses are opened.

The above example is a case where a left-eye image and a right-eye image of the same 3D image are separated using blue light and red light and are then displayed. Even in a case where the left-eye image and the right-eye image of the same 3D image are separated using vertical polarization and horizontal polarization, or using first sync and second sync, a plurality of 3D images may be displayed and specific images may be watched by changing the corresponding characteristics in the manner similar to that of the above example.

Based on the above-described principle, if a plurality of images are displayed by differently setting one or more of polarization characteristics, color characteristics, and time synchronization characteristics, a plurality of 3D images can be played in the same screen area, and the left-eye lens and the right-eye lens of each glasses device are caused to pass only images, displayed using specific polarization characteristics, color characteristics, and time synchronization characteristics, thus allowing a plurality of users to select and watch their desired 3D images.

The number of 3D images that can be simultaneously displayed depending on the number of polarization characteristic types, the number of color characteristic types, and the number of time synchronization characteristic types which can be used in the display device, may be defined by the following table.

In the following table, the number of characteristic types being 1 means that displaying is performed to have the same characteristics without separating the corresponding characteristics, that is, means a case where the corresponding separation scheme is not used. For example, in a case where none of a polarization division scheme, a color division scheme, and a time division scheme are used, all of the numbers of respective characteristic types are 1. In this case, since a 3D image cannot be displayed, the number of simultaneously playable 3D images is 0.

TABLE

| Number of simultaneously playable 3D images | Number of polarization characteristic types | Number of color characteristic types | Number of time synchronization characteristic types |
| --- | --- | --- | --- |
| 0 | 1 | 1 | 1 |
| 1 | 2 | 1 | 1 |
| 1 | 1 | 2 | 1 |
| 1 | 1 | 1 | 2 |
| 2 | 1 | 2 | 2 |
| 2 | 2 | 1 | 2 |
| 2 | 2 | 2 | 1 |
| 4 | 2 | 2 | 2 |
| 3 | 2 | 1 | 3 |
| 3 | 1 | 2 | 3 |
| 6 | 2 | 2 | 3 |
| 4 | 2 | 1 | 4 |
| 4 | 1 | 2 | 4 |
| 8 | 2 | 2 | 4 |

In accordance with the present invention, when a plurality of images are played in the same screen area using a composite division scheme in which two or more of a polarization division scheme, a color division scheme, and a time division scheme are combined, if the left-eye lens and the right-eye lens of the above-described glasses device are caused to pass images having the same polarization characteristics, the same time synchronization characteristics, and the same color characteristics, the corresponding image may be watched in the form of a 2D image other than the form of a 3D image. For example, it is assumed that, when the display device displays a plurality of 3D images in the same screen area using a dual composite division scheme in which a polarization division scheme and a time division scheme are combined, a left-eye image of 3D image A is displayed using the characteristics of vertical polarization-first sync, a right-eye image of the 3D image A is displayed using the characteristics of horizontal polarization-first sync, a left-eye image of 3D image B is displayed using the characteristics of vertical polarization-second sync, and a right-eye image of the 3D image B is displayed using the characteristics of horizontal polarization-second sync. Viewer 'a' may watch the 3D image A in a 2D manner by adjusting the polarization planes and the shutter glasses of the glasses device so that both the left-eye lens and the right-eye lens of the glasses device pass only images having the characteristics of vertical polarization-first sync. In this case, as in the case of the above example in which the 3D image is watched, viewer 'b' may watch 3D image A in a 3D manner by performing adjustment such that the left-eye lens of the glasses device of viewer 'b' passes only an image having the characteristics of vertical polarization-first sync, and the right-eye lens passes only an image having the characteristics of horizontal polarization-first sync. Furthermore, viewer 'c' may watch the 3D image B in a 2D manner by performing adjustment such that both the left-eye lens and the right-eye lens of the glasses device of viewer 'c' pass only images having the characteristics of vertical polarization-second sync. As in the case of the above example in which the 3D image is watched, viewer 'd' may watch 3D image B in a 3D manner by performing adjustment such that the left-eye lens of the glasses device of viewer 'd' passes only an image having the characteristics of vertical polarization-second sync, and the right-eye lens passes only an image having the characteristics of horizontal polarization-second sync.

Based on the above principle, when various images are played in the same screen area by differently setting one or more of polarization characteristics, color characteristics, and time synchronization characteristics, the corresponding image may be selected and watched in a 2D manner by causing the left-eye lens and the right-eye lens of the glasses device to pass only images displayed using the same polarization characteristics, the same color characteristics, and the same time synchronization characteristics, or may be selected and watched in a 3D manner by causing the left-eye lens and the right-eye lens of the glasses device to pass only an image having the characteristics of a left-eye image and only an image having the characteristics of a right-eye image, respectively.

FIG. 9 is a diagram showing a system 400 for playing and watching a plurality of 2D images using polarization characteristics and time synchronization characteristics according to an embodiment of the present invention.

Referring to FIG. 9, the image playing and watching system 400 according to the present invention includes a display device 410 for separately and periodically displaying, on the same screen, a plurality of images A and B in synchronization with each sync signal SYNC1/SYNC2 using different polarizations (or colors), and separately displaying, on the same screen, a plurality of images C and D in synchronization with another sync signal SYNC1/SYNC2 using different polarizations (or colors), and a glasses device 420 having a left-eye lens and a right-eye lens, the shutters of which are opened in synchronization with any one SYNC1/SYNC2 of a plurality of sync signals (more sync signals other than SYNC1 and SYNC2 may be present). Each of different users may watch a single image A/B/C/D displayed using the corresponding polarization (or color), among a plurality of images A and B or another plurality of images C and D, using his or her own glasses device 411/412/413/414. Here, other images displayed in synchronization with other sync signals on the display device 410 may be further displayed so that other users can additionally watch other images.

FIG. 9 illustrates another scheme in which a polarization division scheme and a time division scheme are combined, among cases where a plurality of 2D images are played in the same screen area using a composite division scheme in which two or more of a polarization division scheme, a color division scheme, and a time division scheme are combined, wherein a plurality of users may select and watch their desired 2D images.

As shown in FIG. 9, it is assumed that when the display device 410 displays a plurality of images using a dual composite division scheme in which the polarization division scheme and the time division scheme are combined, image A is displayed using the characteristics of vertical polarization-first sync SYNC1, image B is displayed using the characteristics of horizontal polarization-first sync SYNC1, image C is displayed using the characteristics of vertical polarization-second sync SYNC2, and image D is displayed using the characteristics of horizontal polarization-second sync SYNC2. Viewer 'a' may watch the image A by adjusting polarization planes and shutter glasses such that both the left-eye lens and the right-eye lens of the glasses device 411 pass only the image 411 having the characteristics of vertical polarization-first sync SYNC1. Further, viewer 'b' may watch the image B by performing adjustment such that both the left-eye lens and the right-eye lens of the glasses device 412 pass only an image having the characteristics of horizontal polarization-first sync SYNC1. Furthermore, viewer 'c' may watch the image C by performing adjustment such that both the left-eye lens and the right-eye lens of the glasses device 413 pass only an image 415 having the characteristics of vertical polarization-second sync SYNC2. Furthermore, viewer 'd' may watch the image D by performing adjustment such that both the left-eye lens and the right-eye lens of the glasses device 414 pass only an image 416 having the characteristics of horizontal polarization-second sync SYNC2.

Here, the glasses devices 421/422/423/424 may receive the sync signal SYNC1/SYNC2 in a wired or wireless communication manner through the display device 410 or an external control device. As each user selects an image using the predetermined adjustment means of the glasses device 421/422/423/424, polarization planes and shutter glasses provided in each of the glasses devices are operated in synchronization with the corresponding sync signal, and so the user can watch only specific image A/B/C/D passing through the corresponding polarization planes (or color planes) when the shutters or shutter glasses are opened.

Based on the above principle, when various 2D images are played in the same screen area by differently setting one or more of polarization characteristics, color characteristics, and time synchronization characteristics, a plurality of users may select and watch different 3D images by causing both the left-eye lens and the right-eye lens of each glasses device to pass only images displayed using specific polarization characteristics, color characteristics, and time synchronization characteristics, or combination thereof.

FIG. 10 is a diagram showing a system 500 for playing and watching a single 3D image using polarization characteristics and time synchronization characteristics according to an embodiment of the present invention.

Referring to FIG. 10, the image playing and watching system 500 according to the present invention includes a display device 510 for individually displaying the same image using left-eye polarization and right-eye polarization (or color) in synchronization with different sync signals SYNC1 and SYNC2, and a glasses device 520. The glasses device 520 includes a glasses device 521 including a left-eye lens and a right-eye lens for left-eye polarization (or color) and right-eye polarization, respectively, without having sync signals, or a glasses device 522 including a left-eye lens and a right-eye lens respectively synchronized with any two sync signals SYNC1 and SYNC2 of a plurality of sync signals (more sync signals other than SYNC1 and SYNC2 may be present). Different users may watch the same image A using different types of glasses devices 521 or 522. Here, other images displayed in synchronization with other sync signals on the display device 510 may be further displayed so that other users can additionally watch other images.

FIG. 10 illustrates a case where a single 3D image is played in the same screen area using a composite division scheme in which two or more of a polarization division scheme, a color division scheme, and a time division scheme are combined, wherein the same 3D image may be watched using various types of 3D glasses, such as polarized glasses, shutter glasses, and colored glasses. For this, the display device 510 may display the 3D image such that, for a left-eye image and a right-eye image of the 3D image, all of polarization characteristics, time synchronization characteristics and color characteristics are different, or such that any two of the three types of characteristics are different.

As shown in FIG. 10, when the display device 510 displays a 3D image in the same screen area using a dual composite division scheme in which the polarization division scheme and the time division scheme are combined, a left-eye image may be displayed using the characteristics of vertical polarization-first sync SYNC1, and a right-eye image may be displayed using the characteristics of horizontal polarization-second sync SYNC2. In this case, viewer 'a' may watch 3D image A using polarizing glasses by wearing polarized glasses set such that the left-eye lens of the glasses device 521 passes vertically polarized light and the right-eye lens passes horizontally polarized light. Further, viewer 'b' may also watch the 3D image A by performing adjustment such that the left-eye lens of the glasses device 522 passes an image 511 synchronized with the first sync signal SYNC1 and the right-eye lens passes an image 512 synchronized with the second sync signal SYNC2.

Here, the glasses device 522 may receive the sync signals SYNC1 and SYNC2 in a wired or wireless communication manner through the display device 510 or an external control device. As each user selects an image using the predetermined adjustment means of the glasses device 522, shutter glasses provided in the corresponding glasses device are operated in synchronization with the corresponding sync signals, and so the user can watch only specific image A passing through the corresponding polarization planes (or color planes) when the shutters or shutter glasses are opened.

FIG. 11 is a diagram showing a system 600 for playing and watching a single 3D image using polarization characteristics, color characteristics, and time synchronization characteristics according to an embodiment of the present invention.

Referring to FIG. 11, the image playing and watching system 600 according to the present invention includes a display device 610 for individually displaying the same image in synchronization with different sync signals SYNC1 and SYNC2 using left-eye polarization and right-eye polarization having different colors, and a glasses device 620. The glasses device 620 includes a glasses device 621 including a left-eye lens and a right-eye lens for left-eye polarization and right-eye polarization without having sync signals, a glasses device 622 including a left-eye lens and a right-eye lens having colors for the left eye and the right eye without having sync signals, or a glasses device 622 including a left-eye lens and a right-eye lens, the shutters of which are respectively opened in synchronization with any two sync signals SYNC1 and SYNC2 of a plurality of sync signals (more sync signals other than SYNC1 and SYNC2 may be present). Different users may watch the same image A using different types of glasses devices 621, 622 or 623. Here, other images displayed in synchronization with other sync signals on the display device 610 may be further displayed so that other users can additionally watch other images.

FIG. 11 illustrates one of cases where the display device 610 displays a 3D image using a triple composite division scheme in which a polarization division scheme, a time division scheme, and a color division scheme are combined, wherein a left-eye image may be displayed using the characteristics of vertical polarization-blue light-first sync SYNC1, and a right-eye image may be displayed using the characteristics of horizontal polarization-red light-second sync SYNC2. In this case, viewer 'a' may watch a 3D image using polarized glasses by wearing polarized glasses set such that the left-eye lens of the glasses device 621 passes vertically polarized light and the right-eye lens thereof passes horizontally polarized light. Further, viewer 'b' may watch a 3D image using colored glasses by wearing colored glasses set such that the left-eye lens of the glasses device 622 passes blue light and the right-eye lens thereof passes red light. Furthermore, viewer 'c' may watch a 3D image using shutter glasses by wearing shutter glasses set such that the left-eye lens of the glasses device 623 passes an image synchronized with the first sync signal SYNC1 and the right-eye lens thereof passes an image synchronized with the second sync signal SYNC2.

Here, the glasses device 623 may receive the sync signals SYNC1 and SYNC2 in a wired or wireless communication manner through the display device 610 or an external control device. As each user selects an image using the predetermined adjustment means of the glasses device 623, shutters or the shutter glasses provided in the corresponding glasses device are operated in synchronization with the corresponding sync signals, and so the user can watch only specific image A passing through the corresponding polarization planes (or color planes) when the shutters or shutter glasses are opened.

Based on the above principle, when a left-eye image and a right-eye image of a 3D image are displayed such that all of the polarization characteristics, time synchronization characteristics, and color characteristics thereof are different or such that any two of the three types of characteristics are different, a plurality of users may select various types of 3D glasses devices, such as polarized glasses, shutter glasses, and colored glasses, depending on their preferences and may then watch 3D images.

Although the present invention has been described with reference to a limited number of embodiments and drawings, the present invention is not limited to the above embodiments, and various changes and modifications can be performed by those skilled in the art to which the present invention pertains from the description of the present invention. Therefore, the scope of the present invention should not be limitedly defined by the above-described embodiments and should be defined by the accompanying claims and equivalents thereof.

The invention claimed is:

1. A method of playing and watching an image, comprising:
  displaying a three-dimensional (3D) image implemented as a combination of a left-eye image and a right-eye image on a screen;
  providing an assist device enabling the displayed 3D image to be selectively watched in a form of a two-dimensional (2D) image or a 3D image; and
  passing images through the assist device,
  wherein the assist device comprises first means for passing an image through a left eye of a user and second means for passing an image through a right eye of the user,
  wherein the assist device can adjust the images respectively passing through the first means and the second means so that each of the images is any one of the left-eye image and the right-eye image, and
  wherein passing the images comprises adjusting the assist device so that the images passing through the first means and the second means become an identical image or different images.

2. The method of claim 1, wherein the 3D image is displayed on a single screen, or the left-eye image and the right-eye image are respectively displayed on a plurality of screens installed in an identical area to overlap each other.

3. The method of claim 1, wherein:
  the left-eye image and the right-eye image are simultaneously displayed in different polarizations based on pixels separated on the screen, and
  adjusting the assist device comprises adjusting polarizing directions of the images passing through the first means and the second means.

4. The method of claim 1, wherein:
  the left-eye image and the right-eye image are respectively displayed at periodically separated times, and
  adjusting the assist device comprises the first means and the second means passing the images in synchronization with a time at which any one of the left-eye image and the right-eye image is displayed.

5. The method of claim 1, wherein:
  the left-eye image and the right-eye image forming the 3D image are simultaneously displayed in different colors based on pixels separated on the screen, and
  adjusting the assist device comprises adjusting colors passing through the first means and the second means.

6. A system for playing and watching an image, comprising:
  a display device for displaying a three-dimensional (3D) image implemented as a combination of a left-eye image and a right-eye image on a screen; and
  an assist device for enabling the displayed 3D image to be selectively watched in a form of a two-dimensional (2D) image or a 3D image,
  wherein the assist device comprises first means for passing an image through a left eye of a user, second means for passing an image through a right eye of the user, and an adjustment unit for adjusting the images respectively passing through the first means and the second means so that each of the images is any one of the left-eye image and the right-eye image, and
  the adjustment unit is adjusted so that the images passing through the first means and the second means become an identical image or different images, thus enabling the displayed 3D image to be watched in the form of the 2D image or the 3D image.

7. The system of claim 6, wherein:
  the display device includes a single screen on which the 3D image is displayed, or
  the 3D image is displayed in such a way that a plurality of screens for respectively displaying the left-eye image and the right-eye image are installed in an identical area to overlap each other.

8. The system of claim 6, wherein:
  the display device simultaneously displays the left-eye image and the right-eye image in different polarizations based on separated pixels, and
  the adjustment unit adjusts polarizing directions of images passing through the first means and the second means.

9. The system of claim 6, wherein:
  the display device respectively displays the left-eye image and the right-eye image at periodically separated times, and the adjustment unit performs adjustment such that the first means the second means are synchronized with a time at which any one of the left-eye image and the right-eye image is displayed.

10. The system of claim 9, wherein:
the display device comprises a synchronization unit for transmitting a synchronization (sync) signal for the periodically separated times, and
the assist device comprises a communication unit for performing control such that the first means or the second means passes a corresponding image in synchronization with the sync signal while communicating with the synchronization unit.

11. The system of claim 6, wherein:
the display device simultaneously displays the left-eye image and the right-eye image based on pixels separated on the screen in different colors, and
the adjustment unit adjusts colors of images passing through the first means and the second means.

12. The system of claim 6, wherein the assist device is manufactured in a form of glasses required to watch the screen using the first means and the second means.

13. The system of claim 6, wherein the first means passes an image, identical to that passed by the second means, of the left-eye image and the right-eye image.

14. The system of claim 6, wherein the first means passes an image, different from that passed by the second means, of the left-eye image and the right-eye image.

15. An assist device for assisting watching of an image, the assist device enabling a displayed three-dimensional (3D) image, implemented as a combination of a left-eye image and a right-eye image and displayed on a screen, to be selectively watched in a form of a two-dimensional (2D) image or a 3D image, comprising:
first means for passing an image through the first means to a left eye of a user;
second means for passing an image through the second means to a right eye of the user; and
an adjustment unit for adjusting the images respectively passing through the first means and the second means so that each of the image passing through the first means or the image passing through the second means is any one of the left-eye image and the right-eye image,
wherein the adjustment unit is adjusted so that the image passing through the first means and the image passing through the second means are identical or different, thus enabling the displayed 3D image to be selectively watched by the user in the form of the 2D image or the 3D image.

* * * * *